(No Model.)
J. H. HOAGUE.
DRILL CHUCK.
No. 262,771. Patented Aug. 15, 1882.
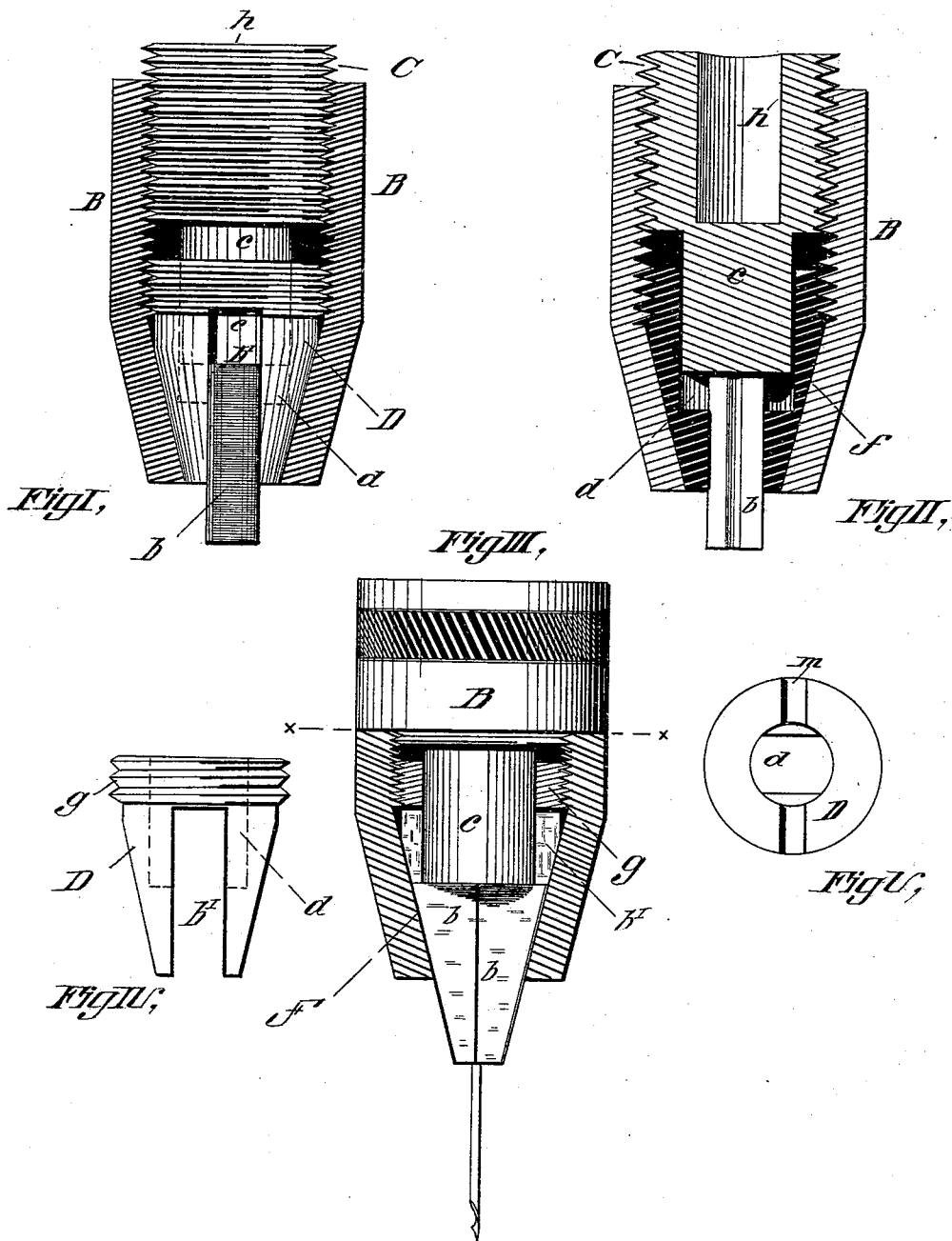

UNITED STATES PATENT OFFICE.

JOHN H. HOAGUE, OF CHICOPEE, MASSACHUSETTS.

DRILL-CHUCK.

SPECIFICATION forming part of Letters Patent No. 262,771, dated August 15, 1882.

Application filed June 29, 1882. (No model.)

*To all whom it may concern:*

Be it known that I, JOHN H. HOAGUE, a citizen of the United States, residing at Chicopee, in the county of Hampden and State of Massachusetts, have invented new and useful Improvements in Drill-Chucks, of which the following is a specification.

This invention relates to an improved drill-chuck; and it consists in a new form of construction, whereby greater simplicity and strength are obtained, and whereby the jaw-operating mechanism is given a greater power in proportion to the size of the chuck than heretofore, to thereby enable an operative chuck to be made of reduced size.

In the drawings, Figure I is a partial longitudinal section of my improved chuck. Fig. II is a complete longitudinal section, with one jaw removed. Fig. III is a partial section on the line $x\ x$, and Figs. IV and V are detail views.

This device, though applicable to the largest drill, is particularly adapted to use upon the smallest hand-drill, where the least dimensions compatible with sufficient strength in the jaw clamping and holding mechanism are requisite.

In the drawings, made to a scale of twice the natural size, B is a shell, cylindrical for the larger part of its length, and having its inner wall at one end form the frustum of a cone, as shown. The cylindrical interior of the shell is threaded throughout.

D is a taper plug, conforming to the interior cone-surface of the shell B. The plug D is provided with a threaded bushing, $g$, a counter-bore, $d$, a slot, $b'$, and a nick, $m$.

$b\ b$ are jaws having their outer edges of the same pitch as the inner cone-surface of shell B, with their combined bases of less extent than the base of plug D, as shown in Fig. III, and their parallel sides slightly less in diameter than the slot $b'$ of plug D.

C is a cylindrical plug, having a threaded bushing, $h$, and provided with a stem, $c$, and socket $h'$.

In operation the plug D is by the screw-driver run into the shell until its conical surface and that of the shell coincide, as shown in the drawings. The jaws $b\ b$ are dropped into their places in slot $b'$ of plug D, and the plug C is run into the shell B to bring its stem $c$ into the counterbore $d$, with its end in approximate adjustment with the parallel base-surface of jaws $b\ b$. The shank of the drill-tool is inserted between the jaws, and the plug C is run down to have its stem $c$, extending into the counterbore, bear against the base of the jaws until they come to a bearing equally upon the cone-surface $f$ of shell B, and upon the shank of the tool, as shown in Fig. III.

The spindle-stem of the drill, when the chuck is combined therewith, is held by friction in the socket $h'$.

By bushing the plugs C and D into a shell of only sufficient thickness to supply a requisite strength a comparatively large perimeter is afforded to cut the threads upon, which can be consequently made in the form of a slow screw having ample strength in a small chuck to resist stripping, and the solid plug C affords space for the socket $h'$ within the threads.

By these means a strong drill-chuck of few parts in compact form is obtained.

Having described my invention, what I claim is—

The combination, with the threaded shell B, having the conical surface $f$, of the conical plug D, having the threaded bushing $g$, slot $b'$, and counterbore $d$, and the plug C, having the threaded bushing $h$, and provided with the stem $c$, all arranged to operate in the manner and for the purpose set forth.

JOHN H. HOAGUE.

Witnesses:
R. F. HYDE,
WM. H. CHAPIN.